US009677856B2

(12) United States Patent
Pendry et al.

(10) Patent No.: US 9,677,856 B2
(45) Date of Patent: Jun. 13, 2017

(54) ELECTROMAGNETIC CLOAKING METHOD

(75) Inventors: John Pendry, London (GB); David Smith, Durham, NC (US); David Schurig, Durham, NC (US)

(73) Assignees: Imperial Innovations Limited, London (GB); Duke University, Durham, NC (US)

( * ) Notice: Subject to any disclaimer, the term of this patent is extended or adjusted under 35 U.S.C. 154(b) by 0 days.

(21) Appl. No.: 11/459,728

(22) Filed: Jul. 25, 2006

(65) Prior Publication Data

US 2008/0024792 A1 Jan. 31, 2008

(51) Int. Cl.
G02B 1/00 (2006.01)
F41H 3/00 (2006.01)
G01S 7/38 (2006.01)
H01Q 15/00 (2006.01)

(52) U.S. Cl.
CPC ............ *F41H 3/00* (2013.01); *G01S 7/38* (2013.01); *H01Q 15/00* (2013.01); *G02B 1/007* (2013.01)

(58) Field of Classification Search
CPC ....................................... G02B 1/002
See application file for complete search history.

(56) References Cited

U.S. PATENT DOCUMENTS

| 6,608,811 | B1* | 8/2003 | Holden et al. ................ 361/303 |
| 6,791,432 | B2* | 9/2004 | Smith et al. ................ 333/99 S |
| 7,522,124 | B2* | 4/2009 | Smith et al. ................ 343/909 |
| 7,538,946 | B2  | 5/2009 | Smith et al. |
| 9,095,043 | B2* | 7/2015 | Boulais ................ H05K 9/00 |
| 2004/0242405 | A1* | 12/2004 | Orme ............................ 502/101 |
| 2006/0071311 | A1  | 4/2006 | Kertesz et al. |
| 2008/0165442 | A1* | 7/2008 | Cai et al. ...................... 359/896 |
| 2011/0050360 | A1* | 3/2011 | Cohen ................ H01Q 21/205 333/135 |
| 2013/0017348 | A1* | 1/2013 | Sanada ................ H01Q 17/00 428/34.1 |

FOREIGN PATENT DOCUMENTS

WO    WO 2004/020186 A2 *  3/2004
WO    2006023195            3/2006

OTHER PUBLICATIONS

Gay-Balmaz et al., "Microwire arrays with plasmonic response at microwave frequencies," Oct. 7, 2002, Applied Physics Letters, vol. 81, No. 16, pp. 2896-2898.*
Fox, "Invisibility cloak one step closer, scientists say," Aug. 10, 2008, Reuters.*

(Continued)

Primary Examiner — Jonathan Hansen
(74) Attorney, Agent, or Firm — Fogg & Powers LLC

(57) ABSTRACT

A method of constructing a concealing volume comprises constructing a plurality of concealing volume elements around a concealable volume. Each concealing volume element has a material parameter arranged to direct a propagating wave around the concealable volume. The material parameter can be refractive index, electrical permittivity and magnetic permittivity. The concealing volume can be a metamaterial. The concealing volume diverts incoming propagating waves such that outgoing propagating waves appear to be unperturbed to an observer.

12 Claims, 10 Drawing Sheets

(56) References Cited

OTHER PUBLICATIONS

Rincon, "Experts test cloaking technology," Oct. 19, 2006, BBC News. http://news.bbc.co.uk/go/pr/fr/-/1/hi/sci/tech/6064620.stm.*

Sci/Tech News Staff, "Scientists understood how to create an invisibility cloak," May 26, 2006, Softpedia.*

Gibson, "Metamaterials found to work for visible light," Jan. 4, 2007, EurekAlert!.*

Landau, "Scientists set sights on invisibility cloaks," 2008, CNN.com. http://www.cnn.com/2008/TECH/07/01/invisible.cloak/index.html#cnnSTCVideo.*

Boutayeb et al., "Analysis and design of a cylindrical EBG-based directive antenna," Jan. 2006, IEEE Transactions of Antennas and Propagation, vol. 54, No. 1, pp. 211-219.*

Yang, "Invisibility shields one step closer with new metamaterials that bend light backwards," Aug. 11, 2008, UC Berkeley press release. http://www.berkeley.edu/news/media/releases/2008/08/11_light.shtml.*

Cook, "Scientists shed new light on invisibility," May 29, 2006, The Boston Globe.*

"Transform," Merriam-Webster Online Dictionary. Accessed on Aug. 29, 2008. http://www.merriam-webster.com/dictionary/transform.*

Purdue News, "Engineers see progress in creating 'invisibility cloak,'" Apr. 2, 2007, Purdue University website accessed at http://news.uns.purdue.edu/x/2007a/070402ShalaevCloaking.html.*

Pendry, J. B., et al. "Extremely Low Frequency Plasmons in Metallic Mesostructures," *The American Physical Society*, 76(25):4773-4776 (1996).

Pendry, J. B., et al., "Magnetism from Conductors and Enhanced Nonlinear Phenomena," *IEEE Transactions on Microwave Theory and Techniques*, 47(11):2075-2084 (1999).

Pendry, John B. and Smith, David R., "Reversing Light With Negative Refraction," *Physics Today*, pp. 37-43 (2004).

Smith, D. R., et al., "Metamaterials and Negative Refractive Index," *Science*, 305: 788-792 (2004).

Alu, Andrea and Engheta, Nader, "Achieving Transparency with Plasmonic and Metamaterial Coatings," *The American Physical Society*, 016623-1-016623-9 (2005).

Schurig, D., et al., "Metamaterial Electromagnetic Cloak at Microwave Frequencies," *Science*, 314: 977-980 (Nov. 10, 2006).

Pendry, J. B., et al., "Controlling Electromagnetic Fields," *Science*, 312: 1780-1782 (Jun. 23, 2006).

D. R. Smith and J. B. Pendry, "Homogenization of metamaterials by field averaging," *J. Opt. Soc. Am. B*, vol. 23, No. 3, Mar. 2006, pp. 391-403.

Aydin et al. (2005) "Investigation of Magnetic Resonances for Different Split-Ring Resonator Parameters and Designs"; New Journal of Physics; 7:168; 15 pages.

Linden et al. (2004) "Magnetic Response of Metamaterials At 100 Terahertz"; Science; 306:1351; 4 pages.

Li et al. (2008) "Hiding Under the Carpet: A New Strategy for Cloaking"; Physical Review Letters; 101:203901.

Liu et al. (2009) "Broadband Ground-Plane Cloak"; Science; 323:366.

Ward et al. (1996) "Refraction and Geometry in Maxwell'S Equations"; Journal of Modern Optics; 43(4):773-793.

Grigorenko et al., "Nanofabricated media with negative permeability at visible frequencies", "Nature Letters", Nov. 17, 2015, pp. 335-338, vol. 438, Publisher: Nature Publishing Group.

* cited by examiner

ELECTROMAGNETIC CLOAKING METHOD

BACKGROUND

In order to exploit electromagnetism, materials are commonly used to control and direct the electromagnetic fields. For example, a glass lens in a camera directs the rays of light to form an image, metal cages are used to screen sensitive equipment from electromagnetic radiation, and various forms of 'black bodies' are utilised to prevent unwanted reflections. One aspect of electromagnetism which is of particular interest, is the use of materials in the manipulation of electromagnetic waves such as to conceal or cloak objects or volumes of space from detection by an outside observer.

Several known methods exist which attempt to achieve electromagnetic concealment of objects. For example, it is possible to use a series of cameras to project an image to an observer of what he would see if an object in question were not blocking his view path. As a result, the observer does not realise that the object is present. This method, however, relies on the use of active components, and depends heavily on the relative positioning of the object, cameras and observer at all times.

Further known concealment methods include traditional "stealth technology" and the use of low radar cross section structures. These are designed to minimize back reflection of radar or other electromagnetic waves. Whilst these structures can provide a reduced or altered electromagnetic signature, because they involve either the scattering of incident waves away from the target or absorbing incident waves, the objects which they hide are still detectable in transmission.

In their paper, Physics Rev. E Vol 72, Art. No., 016623 (2005), A Alu and N Engheta suggest a scheme for the concealment of spherical and cylindrical objects through the use of plasmonic and metamaterial 'cloaks' or covers. Whilst this paper provides a method of reducing the total scattering cross section of such objects, it relies on a specific knowledge of the shape and material properties of the object being hidden. In particular, the electromagnetic cloak and the concealed object form a composite, whose scattering properties can be reduced in the lowest order approximation. Therefore, if the shape of the object changes, the shape of the cloak must change accordingly. Furthermore, this method relies on a resonance effect, such that if the frequency drifts away from its resonant peak, the method is less effective. It is therefore a narrowband method, which cannot be implemented for broadband applications.

A further aspect of electromagnetism which is of interest is the use of materials in electromagnetic sensing and energy harvesting applications. Several known devices exist in this area, such as satellite dishes and solar energy panels. Whilst such prior art devices are operable to collect or detect electromagnetic radiation incident upon them from a number of different directions, and can be moveable to capture radiation incident from any desired direction, they do not have the capability to capture electromagnetic radiation incident from all directions at any given time. Problems therefore arise in applications when the direction of the electromagnetic source is initially unknown or constantly changing, such as in solar energy collection and microwave energy beaming on mobile platforms.

SUMMARY

The invention is set out in the claims. According to a first embodiment, because a method is provided in which those rays which would have passed through a particular volume of space are deflected around the volume and returned to their original trajectory, an observer would conclude that the rays had passed directly through that volume of space. This will be the case regardless of the relative positioning of the observer and the concealed volume. Furthermore, because no radiation can get into the concealed volume nor any radiation gets out, an object of any shape or material placed in the concealed volume will be invisible to the observer.

In one aspect, the invention utilises a co-ordinate transformation approach which is independent of the sizes of the concealed and concealing volume and does not suffer from any of the fundamental scaling issues which affect known concealment schemes.

It is also possible to use the transformation method for any shape of concealed or concealing volume. The wavelength of the electromagnetic radiation does not appear in the solution, such that the invention can be applied for any size structure and for any wavelength, and for near and far fields.

In a further embodiment of the invention, all electromagnetic fields which are incident on an outer surface of a particular volume of space are concentrated into an inner core region, regardless of their direction of incidence on the outer surface. This enables a detector or collector to be placed at the inner core into which the electromagnetic fields have been concentrated, allowing it to interact with the intensified fields from all directions at that location. Because a method is described in which those rays which pass through the particular volume of space are returned to their original trajectory outwards of its outer surface, an observer would conclude that the rays had passed directly through that volume of space, regardless of the relative positioning of the observer and the volume in question. In addition, the present invention enables a detector placed within the inner core region to have its material properties matched to the surrounding layer such that it will also be invisible to an observer viewing the set up from any direction.

BRIEF DESCRIPTION OF THE DRAWINGS

FIG. 8 shows a plan view of a split ring structure in a square array, lattice spacing a;

DETAILED DESCRIPTION

In overview, according to a first embodiment the invention provides a method of concealing an object or volume of space by means of redirecting the electromagnetic field lines around it. Any field lines which normally would flow through the concealed volume are redirected through a surrounding concealing volume. Outside of the cloaking structure, the field lines remain unperturbed. The cloaking structure is formed from a metamaterial, that is a material designed to exhibit the specific material parameters required for cloaking the object or volume in question. In particular, the electric permittivity $\in$ and magnetic permeability $\mu$ and hence the refractive index n of the cloaking metamaterial can be varied effectively continuously spatially in order to manipulate the electromagnetic field lines and hence effectively conceal the enclosed volume. As a result of the invention, the concealed volume is undetectable to an outside observer, and any electromagnetic radiation produced by an object within the concealed volume cannot escape from it.

In a further embodiment the invention provides a method of concentrating the electromagnetic fields incident upon the outer surface of a concentrator device into an inner core region. The concentrator structure comprises a concentrating volume and a collecting volume. Any field lines which would normally flow through the concentrating volume are redirected into an inner collecting volume. Outside of the concentrator annulus surrounding the concentrating volume, the field lines remain unperturbed. The concentrator structure is formed from a metamaterial in a similar manner to that described above for the cloaking structure above.

Figure 1:
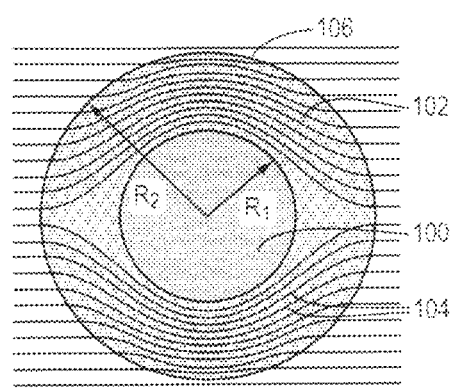
FIG. 1 is a cross-sectional ray trajectory diagram for a sphere of radius $r<R_1$ cloaked within an annulus of radius $R_1<r<R_2$, assuming that $R_2>>\lambda$.

Whilst, as is outlined in more detail below, the transformation method described herein can be applied to conceal any desired volume using any desired cloaking structure, for simplicity it will first be described in relation to the simple spherical case as shown in FIG. 1. According to FIG. 1, the volume to be hidden is a sphere 100 of radius $R_1$ and the cloaking material is contained within the annulus 102 of radius $R_1 < r < R_2$. In order to create a secure, radiation-free volume within the sphere 100 of radius $R_1$, all those electromagnetic field lines 104 which normally would flow through the sphere 106 of radius $r < R_2$ must therefore be compressed into the cloaking annulus 102 $R_1 < r < R_2$. That is, in order to remove the sphere 100 of radius $R_1$ from view, the volume within that sphere 100 plus the volume within the annulus 102 must all be mapped onto the annulus 102 of radius $R_1 < r < R_2$. In the medium outside of the sphere 106 $r < R_2$, the electromagnetic field lines 104 must remain unperturbed.

The theory of propagation of electromagnetic waves is well known and so only the relevant aspects are summarised here in the context of the invention. In free space, the magnetic field strength H is related to the magnetic field intensity B and the magnetic permeability of free space, $\mu_0$, via the equation $B=\mu_0 H$. The electric field E in free space is related to the electric displacement field D and electric permittivity of free space $\in_0$ via the equation $D=\in_0 E$. In a dielectric the value of c and g are modified by the relative permittivity and permeability value $\in_r, \mu_r$ and the refractive index of the invention is given by $$n_r = \sqrt[+]{\varepsilon\mu}.$$

As will be well known to the skilled person in the art, the three vectors E, H, and S are mutually orthogonal, with the Poynting vector S being calculable via the vector cross product $S=E\times H$. The Poynting vector S gives the direction and magnitude of energy flow per unit area per unit time of an electromagnetic wave, and in a ray trajectory diagram such as that shown in FIG. 1, the direction of the rays of light correspond to the electromagnetic field lines and follow the direction of the Poynting vector. In order to implement this invention therefore, it is necessary to focus or redirect any of the electric displacement field D, the magnetic field intensity B, and the Poynting vector S so that they avoid the sphere 100 of radius $R_1$, and return undisturbed to their original trajectories.

As described in more detail below the approach further requires solution of Maxwell's equations in relation to the redirected fields. For ease of depiction, redirection of the Poynting vector in particular will be addressed in the following description.

Figures 2A, 2B:
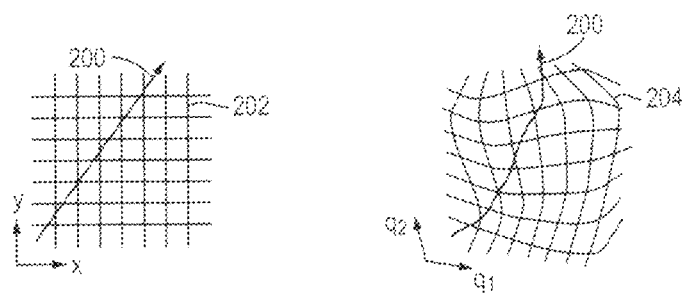
FIG. 2a shows a field line in free space plotted on a Cartesian mesh.
FIG. 2b shows the field line and background coordinates of FIG. 2a both distorted by the same transformation.

In order to calculate the electromagnetic properties which a cloaking structure must possess in order to effectively implement the desired cloaking effects, the first step is to calculate the distortion which must be applied to the Poynting vector S so that the rays do not pass through the sphere 100 of radius $R_1$. As shown in FIGS. 2a and 2b, this is achieved by recording the initial configuration of each ray, which would occur in the absence of a cloaked volume and cloaking material, on a known geometric mesh, such as a spherical or Cartesian mesh. For example in FIG. 2a, a single ray 200 is plotted on a Cartesian mesh 202: Once the appropriate rays 200 have been plotted on it, the Cartesian mesh 202 is stretched or distorted in such a manner that the rays plotted thereon become distorted to follow their new desired path, avoiding the cloaked volume. The distortions which are imposed on the Cartesian mesh 202 in order to achieve this can then be recorded as a coordinate transformation between the original Cartesian mesh 202 and a second transformed mesh 204, wherein the second mesh is defined by:

$$q_1(x,y,z), q_2(x,y,z), q_3(x,y,z) \tag{1}$$

In this second mesh 204, lines of constant $q_2, q_3$ define the generalized $q_1$ axis, and so on. It will be seen that conversely if the second mesh 204 comprised a set of points defined by equal increments along the $q_1, q_2, q_3$ axes, it would appear distorted in the x, y, z Cartesian frame, as a comparison of FIGS. 2a and 2b clearly demonstrates.

The benefit of performing this transformation is that, as described below, it can be shown that it is possible to solve Maxwell's equations in the same form in the transformed geometry as in the original geometry, with only a corresponding transform of the spatially distributed values of ∈ and μt being required. This can be understood intuitively from the recognition that variation of the permittivity ∈ and permeability μ values, and hence the refractive index n in a space, is equivalent to distorting the geometry of the space as seen by a light ray. It will be noted that the approach specifically addresses modification of the value of ∈ and μ individually rather than of the refractive index $n=\pm\sqrt{\in\mu}$. In particular this allows reflection between interfaces of different media to be removed by ensuring impedance (Z) matching where $$Z = \sqrt{\frac{\mu}{\varepsilon}}.$$

As will be known to the skilled person, Maxwell's equations in a system of Cartesian coordinates take the form:

$$\nabla \times E = -\mu\mu_0 \partial h/\partial t,$$

$$\nabla \times H = +\in\in_0 \partial E/\partial t \tag{2}$$

where both electric permittivity ∈ and magnetic permeability μ depend on position. When a coordinate transformation is applied to these equations, in the new co-ordinate system they take the form:

$$\nabla_q \times \hat{E} = \mu_0 \hat{\mu} \partial \hat{H}/\partial t,$$

$$\nabla_q \times \hat{H} = +\in_0 \hat{\in} \partial \hat{E}/\partial t \tag{3}$$

where ∈ and μ are in general tensors, and $\hat{E}$, $\hat{H}$ are renormalized electric and magnetic fields. All four quantities are simply related to originals. In other words the form of Maxwell's equation is preserved by a co-ordinate transformation: the co-ordinate transformation does not change the fact that we are still solving Maxwell's equations, it simply changes the definition of ∈, μ.

In particular, the effect of the transformation on μ and ∈ is to scale them both by a common factor. A generalized solution to this is as follows.

We define three units vectors, $u_1$, $u_2$, $u_3$, to point along the generalized $q_1$, $q_2$, $q_3$ axes. The length of a line element is given by, $$ds^2 = dx^2 + dy^2 + dz^2 = Q_{11}dq_1^2 + Q_{22}dq_2^2 + Q_{33}dq_3^2 + 2Q_{12}dq_1dq_2 + 2Q_{13}dq_1dq_3 + 2Q_{23}dq_2dq_3 \tag{G1}$$

where, $$Q_{ij} = \frac{\partial x}{\partial q_i}\frac{\partial x}{\partial q_j} + \frac{\partial y}{\partial q_i}\frac{\partial y}{\partial q_j} + \frac{\partial z}{\partial q_i}\frac{\partial z}{\partial q_j} \tag{G2}$$

In particular we shall need the length of a line element directed along one of the three axes, $$ds_i = Q_i dq_i \tag{G3}$$

where for shorthand, $$Q_i^2 = Q_{ii} \tag{G4}$$

Figure 2C:
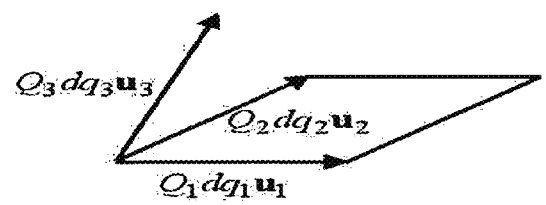
FIG. 2c shows a small element resembling a parallelepiped.
Figure 2D:
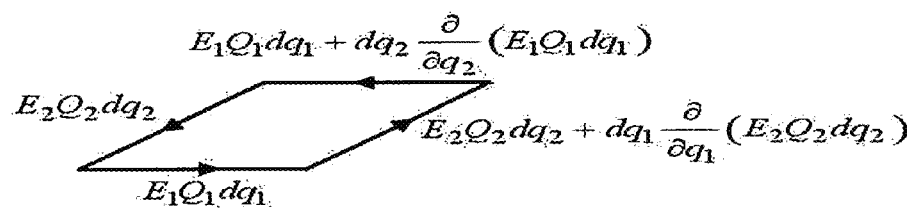
FIG. 2d shows an integration path for solving Maxwell's equations.

To calculate $\nabla \times E$ consider a small element, small enough that it resembles a parallelepiped (FIG. 2c). In this we assume that the transformation has no singularities such as points or lines where the co-ordinate system suddenly heads off in a different direction.

Figure 3:
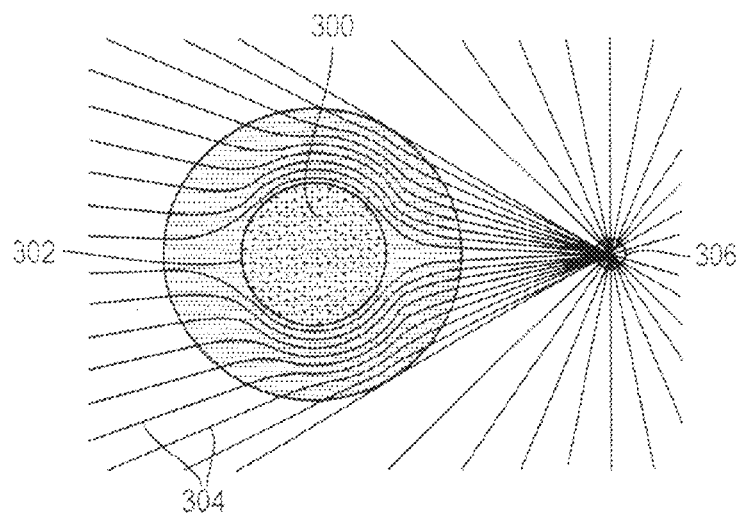
FIG. 3 is a cross-sectional view of the electrostatic displacement field lines for a sphere of radius $r<R_1$ cloaked within an annulus of radius $R_1<r<R_2$, located close to a point charge, assuming that $R_2<<$

First we calculate the projection of $\nabla \times E$ onto the normal to the $u_1$–$u_2$ plane by taking a line integral around the $u_1$–$u_2$ parallelogram and applying Stokes' theorem (FIG. 3). We define, $$E_1 = E \cdot u_1, E_2 = E \cdot u_2, E_3 = E \cdot u_3 \tag{G5}$$

so that, $$(\nabla \times E) \cdot (u_1 \times u_2) dq_1 Q_1 dq_2 Q_2 = \tag{G6}$$
$$dq_1 \frac{\partial}{\partial q_1}(E_2 dq_2 Q_2) - dq_2 \frac{\partial}{\partial q_2}(E_1 dq_1 Q_1)$$

or, $$(\nabla \times E) \cdot (u_1 \times u_2) Q_1 Q_2 = \frac{\partial \hat{E}_2}{\partial q_1} - \frac{\partial \hat{E}_1}{\partial q_2} = (\nabla_q \times \hat{E})^3 \tag{G7}$$

where we use the conventional superscript notation for contravariant components of a vector. We have defined, $$\hat{E}_1 = Q_1 E_1, \hat{E}_2 = Q_2 E_2, \hat{E}_3 = Q_3 E_3 \tag{G8}$$

Note that the right-hand side of equation (10) is simple 'component 3' of curl evaluated in the new co-ordinate system. Now applying .Maxwell, $$(\nabla \times E) \cdot (u_1 \times u_2) Q_1 Q_2 = -\mu_0 \mu \frac{\partial H}{\partial t} \cdot (u_1 \times u_2) Q_1 Q_2 \tag{G9}$$

We write H in terms of the contravariant components, $$H = H^1 u_1 + H^2 u_2 + H^3 u_3 \tag{G10}$$

which in turn can be expressed in terms of the covariant components, $$g^{-1}\begin{bmatrix} H^1 \\ H^2 \\ H^3 \end{bmatrix} = \begin{bmatrix} u_1 \cdot u_1 & u_1 \cdot u_2 & u_1 \cdot u_3 \\ u_2 \cdot u_1 & u_2 \cdot u_2 & u_2 \cdot u_3 \\ u_3 \cdot u_1 & u_3 \cdot u_2 & u_3 \cdot u_3 \end{bmatrix}\begin{bmatrix} H^1 \\ H^2 \\ H^3 \end{bmatrix} = \begin{bmatrix} H_1 \\ H_2 \\ H_3 \end{bmatrix} \tag{G11}$$

where the first part defines g, and $$H_1 = H \cdot u_1, H_2 = H \cdot u_2, H_3 = H \cdot u_3 \tag{G12}$$

Inverting g gives $$H^i = \sum_{j=1}^{3} g^{ij} H_j. \tag{G13}$$

Substituting equation (13) into (12) gives $$(\nabla \times E) \cdot (u_1 \times u_2) Q_1 Q_2 = -\mu_0 \mu \frac{\partial H}{\partial t} \cdot (u_1 \times u_2) Q_1 Q_2 \tag{G14}$$
$$= -\mu_0 \mu \sum_{j=1}^{3} g^{3j} \frac{\partial H_j}{\partial t} u_3 \cdot (u_1 \times u_2) Q_1 Q_2$$

Define $$\hat{\mu}^{ij} = \mu g^{ij} |u_1 \cdot (u_2 \times u_3)| Q_1 Q_2 Q_3 (Q_i Q_j)^{-1} \tag{G15}$$

and $$\hat{H}_j = Q_j H_j \tag{G16}$$

so that, $$(\nabla \times E) \cdot (u_1 \times u_2) Q_1 Q_2 = -\mu_0 \sum_{j=1}^{3} \hat{\mu}^{3j} \frac{\partial \hat{H}_j}{\partial t} \quad (G17)$$

Hence on substituting from equation (10), $$(\nabla_q \times \hat{E})^i = -\mu_0 \sum_{j=1}^{3} \hat{\mu}^{ij} \frac{\partial \hat{H}_j}{\partial t} \quad (G18)$$

and by symmetry between E and H fields, $$(\nabla_q \times \hat{H})^i = +\varepsilon_0 \sum_{j=1}^{3} \hat{\varepsilon}^{ij} \frac{\partial \hat{E}_j}{\partial t} \quad (G19)$$

where $$\hat{\varepsilon} = \varepsilon g^{ij} |u_1 \cdot (u_2 \times u_3)| Q_1 Q_2 Q_3 (Q_i Q_j)^{-1} \quad (G20)$$

Note that these expressions simplify considerably if the new co-ordinate system is orthogonal, e.g. cylindrical or spherical, when $$g^{ij} |u_1 \cdot (u_2 \times u_3)| = \delta_{ij} \quad (G21)$$

In the case of an orthogonal geometry (Cartesian, spherical or cylindrical) but the renormalized values of the permittivity and permeability are:

$$\varepsilon'_u = \varepsilon_u \frac{Q_u Q_v Q_w}{Q_u^2}, \quad (4)$$

$$\mu'_u = \mu_u \frac{Q_u Q_v Q_w}{Q_u^2}, \text{ etc.}$$

$$E'_u = Q_u E_u, \ H'_u = Q_u H_u, \text{ etc.} \quad (5)$$

where, $$Q_u^2 = \left(\frac{\partial x}{\partial u}\right)^2 + \left(\frac{\partial y}{\partial u}\right)^2 + \left(\frac{\partial z}{\partial u}\right)^2 \quad (6)$$

$$Q_v^2 = \left(\frac{\partial x}{\partial v}\right)^2 + \left(\frac{\partial y}{\partial v}\right)^2 + \left(\frac{\partial z}{\partial v}\right)^2$$

$$Q_w^2 = \left(\frac{\partial x}{\partial w}\right)^2 + \left(\frac{\partial y}{\partial w}\right)^2 + \left(\frac{\partial z}{\partial w}\right)^2$$

And:

$$B' \mu_0 \mu' H' \text{ and } D' = \varepsilon_0 \varepsilon E' \quad (7)$$

Referring back to the spherical case as shown in FIG. 1, the natural choice of mesh on which to plot the original ray configuration is a spherical one, which uses the co-ordinates r, θ and φ. The co-ordinate transformation operates by taking all the fields in the sphere 106 of radius r<$R_2$ and compressing them into the annulus 102 of radius $R_1$<r<$R_2$. This is achieved by any transformation of the form:

$$r' = R_1 + \frac{f(r) - f(0)}{f(R_2) - f(0)} (R_2 - R_1), \quad (8)$$

$$\theta' = \theta,$$

$$\phi' = \phi$$

where f (r) is a monotonically increasing function of r, this will map the entire interior of a sphere 106 of radius $R_2$ into an annulus bounded by two spheres 100, 106 radii $R_1$ and $R_2$ respectively. There is symmetry for φ and θ because the field lines are being compressed radially only, so their angular positioning is not distorted.

The simplest solution to equation (8) arises when f(r)=r, which simplifies to give:

$$r' = R_1 + r(R_2 - R_1)/R_2,$$

$$\theta' = \theta,$$

$$\phi' = \phi \quad (9)$$

In order to ascertain the electromagnetic properties which will be required of the cloaking annulus 102 material so that it achieves the desired result of cloaking any object in the sphere 100 $R_1$, the transformation which has been imposed on r, φ and θ must be applied in an analogous manner to ∈ and μ, as shown for the general case above. At each point (x, y, z) in space, ∈ and μ will have component ($\in_x$, $\in_y$, $\in_z$), ($\mu_x$, $\mu_y$, $\mu_z$) which must be transformed to spherical coordinate valve ($\in'_r$, $\in'_\theta$, $\in'_\varnothing$), ($\mu_r$, $\mu_\theta$, $\mu'_\varnothing$) in the transformed geometry.

We do this in two steps:
First transform to spherical coordinates without any compression, $$x = r \cos \phi \sin \theta, y = r \sin \phi \sin \theta, Z = r \cos \theta \quad (A1)$$

so that, as shown in equation (4) above, in the new frame, $$\tilde{\varepsilon}_i = \varepsilon_i \frac{Q_1 Q_2 Q_3}{Q_i^2}, \quad (A2)$$

$$\tilde{\mu}_i = \mu_i \frac{Q_1 Q_2 Q_3}{Q_i^2}$$

We calculate, $$Q_r^2 = \left(\frac{\partial x}{\partial r} = \cos\phi\sin\theta\right)^2 + \left(\frac{\partial y}{\partial r} = \sin\phi\sin\theta\right)^2 + \left(\frac{\partial z}{\partial r} = \cos\theta\right)^2 = 1 \quad (A3)$$

$$Q_\theta^2 = \left(\frac{\partial x}{\partial \theta} = r\cos\phi\cos\theta\right)^2 + \left(\frac{\partial y}{\partial \theta} r\sin\phi\cos\theta\right)^2 + \left(\frac{\partial z}{\partial \theta} = -r\sin\theta\right)^2 = r^2$$

$$Q_\phi^2 =$$

$$\left(\frac{\partial x}{\partial \phi} = -r\sin\phi\sin\theta\right)^2 + \left(\frac{\partial y}{\partial Z} = +r\cos\phi\sin\theta\right)^2 + \left(\frac{\partial z}{\partial Z} = 0\right)^2 = r^2 \sin^2\theta$$

and hence, $$\tilde{\varepsilon}_r = \tilde{\mu}_r = \frac{Q_r Q_\theta Q_\phi}{Q_r^2} \varepsilon_r = \frac{r^2 \sin\theta}{1} \varepsilon_r = r^2 \sin\theta \varepsilon_r \quad (A4)$$

-continued $$\tilde{\varepsilon}_\theta = \tilde{\mu}_\theta = \frac{Q_r Q_\theta Q_\phi}{Q_\theta^2}\varepsilon_\theta = \frac{r^2\sin\theta}{r^2}\varepsilon_\theta = \sin\theta\varepsilon_\phi$$

$$\tilde{\varepsilon}_\phi = \tilde{\mu}_\phi = \frac{Q_r Q_\theta Q_\phi}{Q_\phi^2}\varepsilon_\phi = \frac{r^2\sin\theta}{r^2\sin^2\theta}\varepsilon_\phi = \frac{1}{\sin\theta}\varepsilon_\phi$$

where $\in_r$, $\in_\theta$, $\in_\phi$ the three components of the permittivity tensor in the original Cartesian frame, and we assume that the permittivity and permeability are equal. Note that we can easily extract the Cartesian view of $\in_r$, $\in_\theta$, $\in_\phi$ from (A4) by removing the appropriate factors of r.

In order to create a protected space inside the sphere radius $R_1$ we make a further transformation to a new cylindrical system in which the radius is compressed taking any ray trajectories with it. It is noted that computer programs work in Cartesian coordinates and therefore that it is possible to re-express the compressed radial coordinate system in terms of a compressed Cartesian system, x' y' z', by removing factors of r'.

Consider the transformation from equation (9), $$r'=R_1+r(R_2-R_1)/R_2, \theta'=\theta, \phi'=\phi \quad (A5)$$

which can be re-expressed as, $$r = \frac{(r'-R_1)R_2}{R_2 - R_1}, \theta' = \theta, \phi' = \phi \quad (A6)$$

We calculate, $$Q_{r'}^2 = \left(\frac{\partial r}{\partial r'} = \frac{R_2}{R_2 - R_1}\right)^2 + \left(\frac{\partial \theta}{\partial r'} = 0\right)^2 + \left(\frac{\partial \phi}{\partial r'} = 0\right)^2 = \left[\frac{R_2}{R_2 - R_1}\right]^2 \quad (A7)$$

$$Q_{\theta'}^2 = \left(\frac{\partial r}{\partial \theta'} = 0\right)^2 + \left(\frac{\partial \theta}{\partial \theta'} = 1\right)^2 + \left(\frac{\partial \phi}{\partial \theta'} = 0\right)^2 = 1$$

$$Q_{\phi'}^2 = \left(\frac{\partial r}{\partial \phi'} = 0\right)^2 + \left(\frac{\partial \theta}{\partial \phi'} = 0\right)^2 + \left(\frac{\partial \phi}{\partial \phi'} = 1\right)^2 = 1$$

so that in the new frame,
for $R_1 < r' < R_2$ $$\tilde{\varepsilon}_{r'} = \tilde{\mu}_{r'} = \tilde{\varepsilon}_r \frac{Q_{r'}Q_{\theta'}Q_{\phi'}}{Q_{r'}^2} = \frac{(R_2 - R_1)}{R_2}r^2 \sin\theta \varepsilon_r \quad (A8a)$$

$$= \frac{(R_2 - R_1)}{R_2}\left[\frac{(r'-R_1)R_2}{R_2 - R_1}\right]^2 \sin\theta \varepsilon_r = \frac{R_2(r'-R_1)^2}{R_2 - R_1} \sin\theta \varepsilon_r$$

$$\tilde{\varepsilon}_{\theta'} = \tilde{\mu}_{\theta'} = \tilde{\varepsilon}_\theta \frac{Q_{r'}Q_{\theta'}Q_{\phi'}}{Q_{\theta'}^2} = \frac{R_2}{R_2 - R_1}\sin\theta \varepsilon_\theta$$

$$\tilde{\varepsilon}_{\phi'} = \tilde{\mu}_{\phi'} = \tilde{\varepsilon}_\phi \frac{Q_{r'}Q_{\theta'}Q_{\phi'}}{Q_{\phi'}^2} = \frac{R_2}{R_2 - R_1}\frac{1}{\sin\theta}\varepsilon_\phi$$

Alternatively we can reinterpret these values in a Cartesian coordinate frame, x'y'z', which is easily done by comparison with (A4), $$\varepsilon_{r'} = \mu_{r'} = \frac{R_2}{R_2 - R_1}\frac{(r'-R_1)^2}{r'^2}\varepsilon_r \quad (10)$$

$$\varepsilon_{\theta'} = \mu_{\theta'} = \frac{R_2}{R_2 - R_1}\varepsilon_\theta$$

$$\varepsilon_{\phi'} = \mu_{\phi'} = \frac{R_2}{R_2 - R_1}\varepsilon_\phi$$

where we have assumed that the starting material is vacuum. for $R_2 < r'$ $$\tilde{\varepsilon}_{r'} = \tilde{\mu}_{r'} = r'^2 \sin\theta' \varepsilon_{r'} \quad (A7b)$$

$$\tilde{\varepsilon}_{\theta'} = \tilde{\mu}_{\theta'} = \sin\theta' \varepsilon_{\theta'}$$

$$\tilde{\varepsilon}_{z'} = \tilde{\mu}_{z'} = \frac{1}{\sin\theta'}\varepsilon_{\phi'}$$

In free space, $\in_{r'}' = \mu_{r'}' = \in_\theta' = \varepsilon_\phi' = \mu_\phi' = 1 \quad (11)$ for $r' < R_1$ we may choose any value we please for the dielectric functions since radiation never penetrates into this region. In this region $\in'$, $\mu'$ are free to take any value without restriction whilst still remaining invisible, and not contributing to electromagnetic scattering. This will be the case for all cloaked volumes, regardless of their shape or size.

If a suitable cloaking material can be implemented for the annulus 102 of radius $R_1 < r < R_2$, this will exclude all fields from entering the central region 100 of radius $R_1$ and, conversely, will prevent all fields from escaping from this region. The cloaking structure itself and any object placed in the concealed sphere 100 $R_1$ will therefore be undetectable in either reflection or transmission. It will be noted that at all points in the medium the impedance $$z = \sqrt{\frac{\mu}{\varepsilon}} = 1$$

such that no unwanted reflection in the medium, caused by impedance mismatch, takes place.

It is noted that if the impendance $z=\sqrt{\mu/\in}=1$ is achieved at all points in the metamaterial, the cloaking structure and concealed volume will appear to contain only free space, and so will be invisible if embedded in free space. If the cloaking structure is embedded in another medium the effect will differ, for example if embedded in water it would have the appearance of a bubble. In order to make the cloaking structure invisible in another medium it is necessary to match the ratio of $\mu$ and $\in$ in the metamaterial to that of the surrounding medium at the interface between the two. As the skilled person will appreciate, whilst this changes the numerical values of $\in$ and $\mu$ in the cloaking structure metamaterial, the general transformation theory outlined above remains the same. That is, because the present invention enables $\in$ and $\mu$ to be controlled in a metamaterial independently of one another, it is possible to achieve any desired value of z, to match the impedance of the metamaterial to that of its surroundings.

Whilst in FIG. 1 the cloaking annulus 102 is depicted as being relatively thick, this does not have to be the case. The solution is not dependent on shell thickness or any other length scales, such that it does not suffer from any scaling issues. Additionally, the solution provided holds in both in the near and far fields, because the solution does not depend on the wavelength λ. This is demonstrated in FIGS. 1 and 3. For purposes of illustration, suppose that $R_2 \gg \lambda$ where λ, is the wavelength so that we can use the ray approximation to plot the Poynting vector. If our system is then exposed to a source of radiation at infinity we can perform the ray tracing exercise shown in FIG. 1. Rays 104 in this figure result from numerical integration of a set of Hamilton's equations obtained by taking the geometric limit of Maxwell's equations with anisotropic, inhomogeneous media. This integration provides an independent confirmation that the configuration specified by (9) and (10) excludes rays from the interior region 100. Alternatively if $R_2 \ll \lambda$, and we locate a point charge 306 nearby, the electrostatic (or magnetostatic) approximation applies. A plot of the local electrostatic displacement field which results is shown in FIG. 3.

Figure 4A:
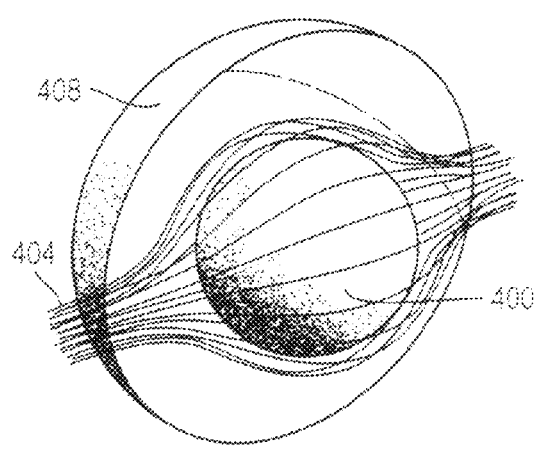
FIG. 4a is a three-dimensional depiction of the diversion of electromagnetic rays around a cloaked volume, according to the present invention.
Figure 4B:
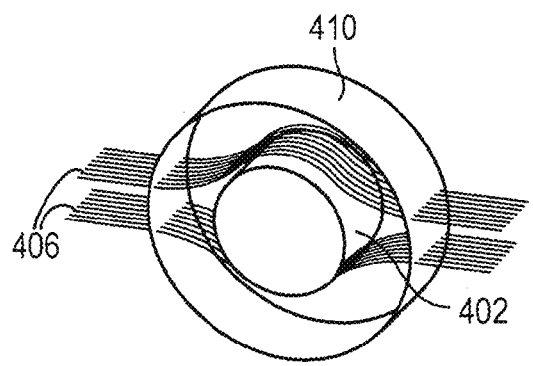
FIG. 4b is a three-dimensional depiction of the diversion of electromagnetic rays around a cloaked surface, according to the present invention.

The theoretical solution outlined above can be demonstrated using a ray-tracing program to calculate the ray trajectories. According to such a program, a specified material is assumed to exist around a central volume that is to be 'cloaked', or rendered invisible to the user. Using the specified parameters as input, the ray-tracing code confirms the theoretical prediction. Ray tracing programs of this type will be well known to those skilled in the art, although some existing programs will not be able to deal with the complexity of the problem for this invention. In FIGS. 4a and 4b, a ray tracing program has been used which was developed from a custom ray tracing code based on a Hamiltonian formulation to solve Maxwell's equations in the geometric limit (ie zero wavelength limit). The results are shown for a spherical structure 400 and a cylindrical structure 402 respectively, wherein the transformed parameters $\in$ and $\mu$ in the cylindrical case are calculated in a similar manner to those for the sphere, as shown below:

First transform to cylindrical coordinates without any compression, $$x = r \cos\theta, y = r \sin\theta, Z = z \tag{A8}$$

so that in the new frame, $$\tilde{\varepsilon}_i = \varepsilon_i \frac{Q_1 Q_2 Q_3}{Q_i^2}, \qquad \tilde{\mu}_i = \mu_i \frac{Q_1 Q_2 Q_3}{Q_i^2} \tag{A9}$$

We calculate, $$Q_r^2 = \left(\frac{\partial x}{\partial r} = \cos\theta\right)^2 + \left(\frac{\partial y}{\partial r} = \sin\theta\right)^2 + \left(\frac{\partial z}{\partial r} = 0\right)^2 = 1 \tag{A10}$$

$$Q_\theta^2 = \left(\frac{\partial x}{\partial \theta} = -r\sin\theta\right)^2 + \left(\frac{\partial y}{\partial \theta} = +r\cos\theta\right)^2 + \left(\frac{\partial z}{\partial \theta} = 0\right)^2 = r^2$$

$$Q_Z^2 = \left(\frac{\partial x}{\partial Z} = 0\right)^2 + \left(\frac{\partial y}{\partial Z} = 0\right)^2 + \left(\frac{\partial z}{\partial Z} = 1\right)^2 = 1$$

and hence, $$\tilde{\varepsilon}_r = \tilde{\mu}_r = \frac{Q_r Q_\theta Q_Z}{Q_r^2} \varepsilon_r = r\varepsilon_r \tag{A11}$$

$$\tilde{\varepsilon}_\theta = \tilde{\mu}_\theta = \frac{Q_r Q_\theta Q_Z}{Q_\theta^2} \varepsilon_\theta = r^{-1} \varepsilon_\theta$$

$$\tilde{\varepsilon}_Z = \tilde{\mu}_Z = \frac{Q_r Q_\theta Q_Z}{Q_Z^2} \varepsilon_Z = r\varepsilon_Z$$

where $\in_r, \in_\theta, \in_Z$ the three components of the permittivity tensor in the original Cartesian frame, and we assume that the permittivity and permeability are equal. Note that we can easily extract the Cartesian view of $\in_r, \in_\theta, \in_Z$ from (A13) by removing the appropriate factors of r.

In order to create a protected space inside a cylinder radius $R_1$, we make a further transformation to a new cylindrical system in which the radius is compressed taking any ray trajectories with it. It is noted that computer programs work in Cartesian coordinates and therefore that it is possible to re-express the compressed radial coordinate system in terms of a compressed Cartesian system, x'y'z', by removing factors of r'.

Consider the transformation, $$r' = R_1 + r(R_2 - R_1)/R_2, \theta' = \theta, Z' = Z \tag{A12}$$

or, $$r = \frac{(r' - R_1)R_2}{R_2 - R_1}, \theta' = \theta, Z' = Z \tag{A13}$$

We calculate, $$Q_{r'}^2 = \tag{A14}$$

$$\left(\frac{\partial r}{\partial r'} = \frac{R_2}{R_2 - R_1}\right)^2 + \left(\frac{\partial \theta}{\partial r'} = 0\right)^2 + \left(\frac{\partial Z}{\partial r'} = 0\right)^2 + \left[\frac{R_2}{R_2 - R_1}\right]^2$$

$$Q_{\theta'}^2 = \left(\frac{\partial r}{\partial \theta'} = 0\right)^2 + \left(\frac{\partial \theta}{\partial \theta'} = 1\right)^2 + \left(\frac{\partial Z}{\partial \theta'} = 0\right)^2 = 1$$

$$Q_{Z'}^2 = \left(\frac{\partial r}{\partial Z'} = 0\right)^2 + \left(\frac{\partial \theta}{\partial Z'} = 0\right)^2 + \left(\frac{\partial Z}{\partial Z'} = 1\right)^2 = 1$$

so that in the new frame,
for $R_1 < r' < R_2$ $$\tilde{\varepsilon}_{r'} = \tilde{\mu}_{r'} = \tilde{\varepsilon}_r \frac{Q_{r'} Q_{\theta'} Q_{Z'}}{Q_{r'}^2} = \frac{(R_2 - R_1)}{R_2} r\varepsilon_r \tag{A15a}$$

$$= \frac{(R_2 - R_1)}{R_2} \frac{(r' - R_1)R_2}{R_2 - R_1} \varepsilon_r = (r' - R_1)\varepsilon_r$$

$$\tilde{\varepsilon}_{\theta'} = \tilde{\mu}_{\theta'} = \tilde{\varepsilon}_\theta \frac{Q_{r'} Q_{\theta'} Q_{Z'}}{Q_{\theta'}^2} = \frac{R_2}{R_2 - R_1} r^{-1} \varepsilon_\theta$$

$$= \frac{R_2}{R_2 - R_1} \frac{R_2 - R_1}{(r' - R_1)R_2} \varepsilon_\theta = \frac{1}{(r' - R_1)} \varepsilon_\theta$$

$$\tilde{\varepsilon}_{Z'} = \tilde{\mu}_{Z'} = \tilde{\varepsilon}_Z \frac{Q_{r'} Q_{\theta'} Q_{Z'}}{Q_{Z'}^2} = \frac{R_2}{R_2 - R_1} r\varepsilon_Z$$

$$= \frac{R_2}{R_2 - R_1} \frac{(r' - R_1)R_2}{R_2 - R_1} \varepsilon_Z = \left[\frac{R_2}{R_2 - R_1}\right]^2 (r' - R_1)\varepsilon_Z$$

for $R_2 < r'$ $$\tilde{\in}_{r'} = \tilde{\mu}_{r'} = r' \in_{r'}$$

$$\tilde{\in}_{\theta'} = \tilde{\mu}_{\theta'} = r'^{-1} \in_{\theta'}$$

$$\tilde{\in}_{Z'} = \tilde{\mu}_{Z'} = r' \in_{Z'} \tag{A15b}$$

for $r' < R_1$ we may choose any value we please for the dielectric functions since radiation never penetrates into this region.

Alternatively we can reinterpret these values in a Cartesian coordinate frame, x'y'z', which is easily done by comparison with (A4), $$\varepsilon_{r'} = \mu_{r'} = \frac{r' - R_1}{r'} \tag{A16}$$

-continued $$\varepsilon_{\theta'} = \mu_{\theta'} = \frac{r'}{(r' - R_1)}$$

$$\varepsilon_{Z'} = \mu_{Z'} = \left[\frac{R_2}{R_2 - R_1}\right]^2 \frac{r' - R_1}{r'}$$

where we have assumed that the starting material is vacuum.

FIGS. 4a and 4b show that the incident rays 404, 406 are diverted around a central region 400, 402 and emerge from the cloaking region 408, 410 apparently unperturbed, as predicted by the theoretical solution.

Whilst the theoretical solution has been confirmed by ray-tracing methods, in order to put the invention into effect a suitable material to form the cloaking structure has been developed.

The material parameters of the cloaking structure require that the components of ∈' equal those of μ', that ∈' and μ' vary throughout space, and that the tensor components of ∈' and μ' vary independently. The anticipated material is thus inhomogeneous and anisotropic. Moreover, the material parameters ∈' and μ' must assume values less than unity and approach zero at the interface between the concealed region and the cloaking shell. Furthermore, it is noted that equation (6) is singular at r'=R₁. This is unavoidable as can be seen by considering a ray headed directly towards the centre of the sphere 100 (FIG. 1). This ray does not know whether to be deviated up or down, left or right. Neighbouring rays 104 are bent around tighter and tighter arcs closer to the critical ray they are. This in turn implies very steep gradients in ∈' and μ'. Parameters ∈' and μ' are necessarily anisotropic in the cloaking material because space has been compressed anisotropically. This set of constraints is not attainable by conventional materials for example because finding matching values for ∈ and μ in the same waveband does not occur. However, given the rapid progress that has occurred over the past several years in artificial materials, a metamaterial can be practically designed that satisfies the specifications.

Metamaterials are artificially constructed 'materials' which can exhibit electromagnetic characteristics that are difficult or impossible to achieve with conventional materials. From an electromagnetic point of view, the wavelength, λ, of a wave passing through a material determines whether a collection of atoms or other objects can be considered a material and properties at the atomic level determine ∈ and μ. However, the electromagnetic parameters ∈ and μ need not arise strictly from the response of atoms or molecules: Any collection of objects whose size and spacing are much smaller than λ can be described by an ∈ and μ. In that case, the values of ∈ and μ are determined by the scattering properties of the structured objects. Although such an inhomogeneous collection may not satisfy an intuitive definition of a material, an electromagnetic wave passing through the structure cannot tell the difference, and, from the electromagnetic point of view, we have created an artificial material, or metamaterial. This properties of metamaterials are explained further in "Metamaterials and Refractive Index", D R Smith, J B Pendry, MCK. Wiltshire, VOL 305, SCIENCE 061081 (2004). which is incorporated herein by reference.

Figure 5:
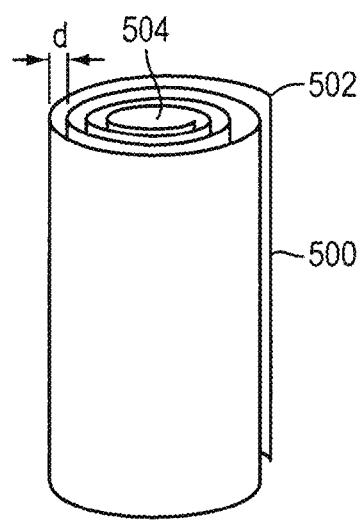
FIG. 5 shows a front perspective view of a 'Swiss-roll' metamaterial.
Figure 6:
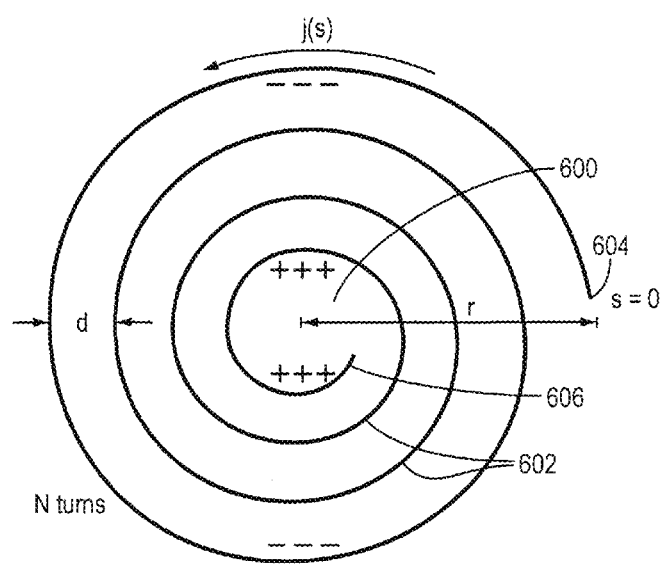
FIG. 6 shows a top view of the 'Swiss-roll' metamaterial of FIG. 5.

One useful property exhibited by certain metamaterials is that of artificial magnetism. It has been found that structures consisting of non-magnetic arrays of wire loops in which an external field can induce a current consequently produce an effective magnetic response. One such design is the so-called 'Swiss-roll' structure, as shown in FIG. 5. The roll 500 is manufactured by rolling an insulated metallic sheet around a cylinder 504. A design with about 11 turns on a 1-cm-diameter cylinder gives a resonant response at 21 MHz. The metamaterial is formed by stacking together many of these cylinders. In this structure, the coiled copper sheets have a self-capacitance and self-inductance that create a resonance. The currents that flow when this resonance is activated couple strongly to an applied magnetic field, yielding an effective permeability that can reach quite high values. No current can flow around the coil except by self capacitance. As is shown in FIG. 6, when a magnetic field parallel to the cylinder 600 is switched on it induces currents (j) in the coiled sheets 602, which are spaced a distance d apart from one another. Capacitance between the first 604 and last 606 turns of the coil enables current to flow. This is described further in "Magnetism from Conductors and Enhanced Non-Linear Phenomena", J B Pendry, A J Holden, D J Robbins and W J Stewart IEEE Trans. Micr. Theory and Techniques, 47, 2075 (1999), which is incorporated herein by reference.

Figure 7:
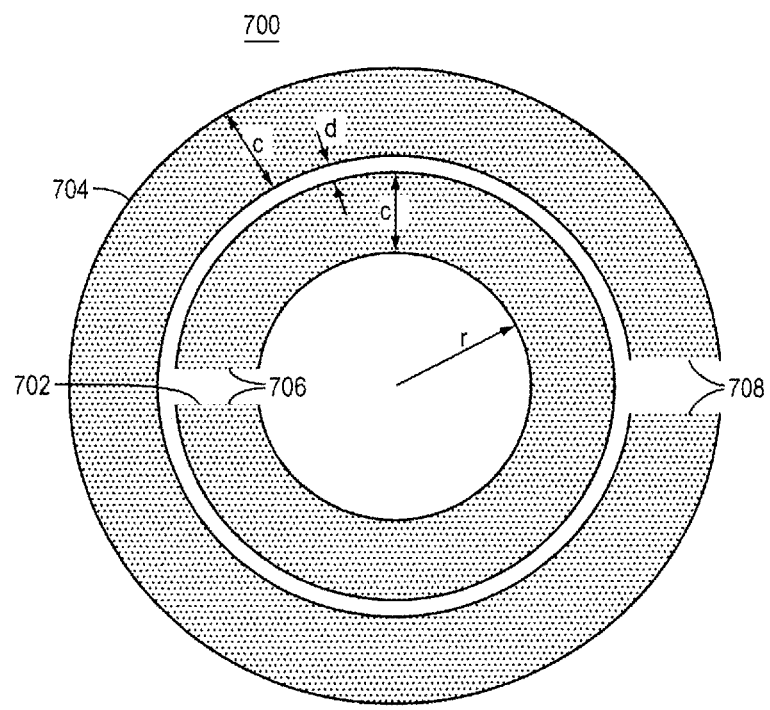
FIG. 7 shows a single split ring metamaterial.

One problem with the Swiss-roll structures is that the continuous electrical path provided by metal cylinders can cause the metamaterial to respond like an effective metal when the electric field applied is not parallel to the cylinders, hence restricting its usefulness in certain applications. An adaptation described in the same paper which avoids this undesirable effect is the split ring resonator (SRR). The SRR is built up from a series of split rings, as shown in FIG. 7. Each split ring 700 comprises at least two concentric thin metal rings 702, 704 of width c, spaced apart by a distance d, each one with a gap, 706, 708. By eliminating the continuous conducting path which the cylinders provide, an SRR eliminates most of the electrical activity along this direction.

Figure 8:
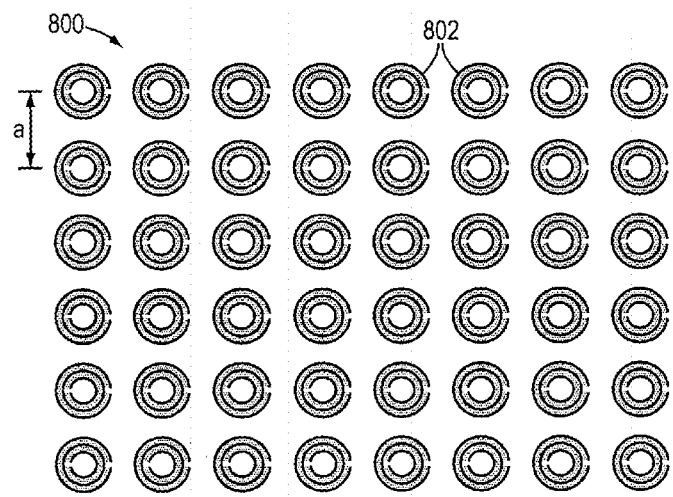

As shown in FIG. 8, it is possible to form a planar split ring structure 800 from a series of split rings 802, spaced a distance a apart. The two dimensional square array 800 shown in FIG. 8 can be made by printing with metallic inks. If each printed sheet is then fixed to a solid block of inert material, thickness a, the blocks can be stacked to give columns of rings. This would establish magnetic activity along the direction of stacking, z-axis.

Figure 9:
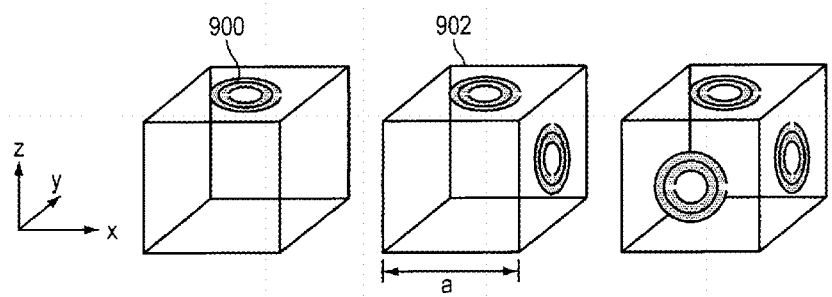
FIG. 9 depicts the building of three-dimensional split ring resonator (SRR) at unit cell level.

The unit cell 900 of the stacked SRR structure is shown in FIG. 9 on the left. It is possible to form a symmetrical three dimensional structure starting from such a structure comprising successive layers of rings stacked along the z-axis. This is achievable by cutting up the structure into a series of slabs thickness a, making incisions in the y-z plane and being careful to avoid slicing through any of the rings. Each of the new slabs contains a layer of rings but now each ring is perpendicular to the plane of the slab and is embedded within. The next stage is to print onto the surface of each slab another layer of rings and stack the slabs back together again. The unit cell 902 of this second structure is shown in the middle of FIG. 9. In the final step, a third set of slabs is produced by cutting in the x-z plane, printing on the surface of the slabs, and reassembling. This results in a structure with cubic symmetry whose unit cell 904 is shown on the right of FIG. 9.

Similarly ∈ can be governed by an array of thin wires as described in "Extremely Low Frequency Plasmas in Metallic Mesostructures", J B Pendry, A J Holden, W J Stewart, I Youngs, Phys Rev Lett, 76, 4773 (1996) which is incorporated herein by reference.

Hence known techniques can be applied to construct the metamaterial required to put the current invention as described above into practice. The materials comprise many unit cells, each of which is designed to have a predetermined value for $\epsilon'$ and $\mu'$, such that they correspond to the values determined by equation (4) above (or for the non-orthogonal case, equation G23 above. As will be apparent to the skilled reader, this may involve each unit cell having slightly different values of $\epsilon'$ and $\mu'$ to those of its radially neighbouring cells. Each unit cell in the metamaterial acts as a concealing volume element. The concealing volume elements are assembled in the correct respective spatial positions to form the cloaking structure, as calculated by the methods outlined above. The cloaking structure will, as a result, possess the spatially distributed material parameter values required for electromagnetic concealment of the enclosed volume.

Figure 10:
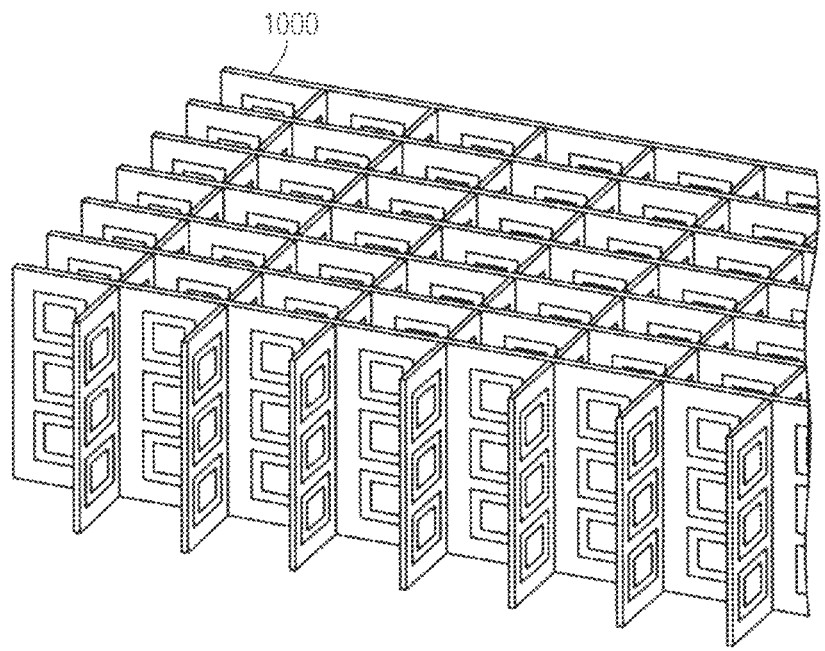
FIG. 10 is a prior-art negative index metamaterial comprising SRR's and wires.

For practical implementation of the theory outlined above, a three dimensional cloaking structure will be necessary in most cases. A solid composite metamaterial structure can be formed using fabrication techniques similar to those used to manufacture a gradient index lens. One such known structure 1000 is shown in FIG. 10, in which SRR's and wires are deposited on opposite sides lithographically on a standard circuit board to provide a desired material response. This is described in more detail in "Reversing Light with Negative Refraction", J B Pendry, D R Smith, Physics Today, June 2004, which is incorporated herein by reference.

Figure 11:
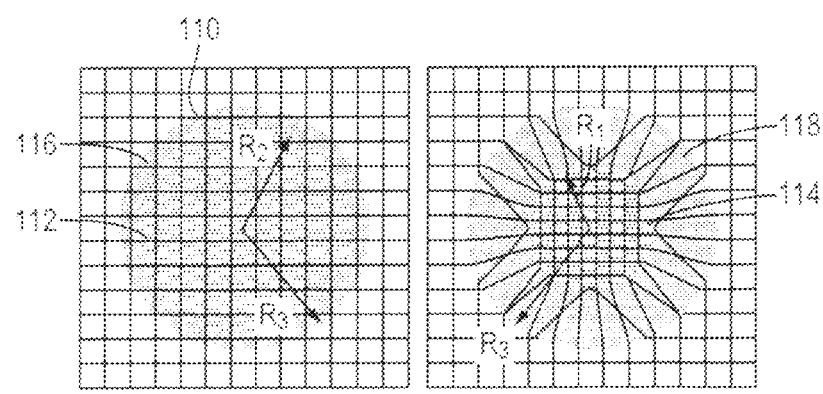
FIG. 11 is a cross-sectional ray trajectory diagram of a concentration device of radius $R_3$ in which a spherical volume of space radius $R_2$ is compressed to a smaller volume of space radius $R_1$.

The unit cell structure of the metamaterial used ensures that anisotropy and continuous variation of the parameters, as required by the theoretical solution, can be achieved. Unrelated to cloaking, another application of the transformation theory described above is a device for concentrating fields. FIG. 11 shows a concentrator that concentrates electromagnetic fields incident upon its outer surface (110) onto an inner core region (114). The transformation that characterizes the concentrator, for the spherical geometry, is shown in FIG. 11. The outer radius of the device (110) is $R_3$. A concentrating volume of space (112) with radius $R_2 < R_3$ is compressed to a collecting volume (114) of radius $R_1$. The shell volume (116) that lies between $R_2$ and $R_3$ is expanded to fill the region (118) between $R_1$ and $R_3$, as FIG. 11 depicts. A simple example of this transformation that compresses the core (112) uniformly and stretches the shell region (116) with a linear radial function is given by $$r = \begin{cases} \frac{R_2}{R_1} r' & 0 < r' < R_1 \\ \frac{R_2 - R_1}{R_3 - R_1} R_3 + \frac{R_3 - R_2}{R_3 - R_1} r' & R_1 < r' < R_3 \\ r' & R_3 < r' \end{cases} \quad (12)$$

$$\theta = \theta'$$

$$\phi = \phi' \quad (13)$$

The resulting material properties of permitting and permeability in the concentration device are then $$[\epsilon'_{r'}, \epsilon'_{\theta'}, \epsilon'_{\phi'}] = [\mu'_{r'}, \mu'_{\theta'}, \mu'_{\phi'}] = \quad (15)$$

$$\begin{cases} \frac{R_2}{R_1}[1,1,1] & 0 < r' < R_1 \\ \frac{R_3 - R_2}{R_3 - R_1}\left[\left(1 + \frac{R_2 - R_1}{R_3 - R_2}\frac{R_3}{r'}\right)^2, 1, 1\right] & R_1 < r' < R_3 \\ [1,1,1] & R_3 < r' \end{cases}$$

where the material properties are given relative to the external environment. As with the cloaking structure, the external environment may be free space or any other medium.

In order to concentrate fields into an arbitrarily small volume, we let $R_1 \to 0$ and obtain $$[\epsilon'_{r'}, \epsilon'_{\theta'}, \epsilon'_{\phi'}] = [\mu'_{r'}, \mu'_{\theta'}, \mu'_{\phi'}] = \quad (16)$$

$$\begin{cases} \frac{R_3 - R_2}{R_3}\left[\left(1 + \frac{R_3}{R_3 - R_2}\frac{R_2}{r'}\right)^2, 1, 1\right] & 0 < r' < R_3 \\ [1,1,1] & R_3 < r' \end{cases}$$

If we wish the concentration cross section of the sphere to equal its outer radius, then we let $R_2 \to R_3$.

$$\lim_{R_2 \to R_3}[\epsilon'_{r'}, \epsilon'_{\theta'}, \epsilon'_{\phi'}] = \quad (17)$$

$$\lim_{R_2 \to R_3}[\mu'_{r'}, \mu'_{\theta'}, \mu'_{\phi'}] = \begin{cases} [+\infty, 0, 0] & 0 < r' < R_3 \\ [1,1,1] & R_3 < r' \end{cases}$$

This is the perfect field concentrator. The material parameters which are required in the concentrator can be achieved through the use of metamaterials as described in relation to the cloaking structure. The permittivity $\epsilon$ and permeability $\mu$ can be controlled independently of one another in each of three dimensions within each unit cell of the metamaterial.

The concentrator device is unique, and different from focusing lenses and mirrors, in that it operates on fields incident from any direction. For electromagnetic sensing or energy harvesting applications, a detector or collector would be placed at the core (114) to interact with the intensified fields at that location. Part of the utility of this device is concentration of fields when the direction of their source is initially unknown or constantly changing e.g. solar energy collection or microwave energy beaming on mobile platforms.

A detector placed at the concentrator's core (114) could easily be configured to provide accurate directional information as well as collect the energy. This could be accomplished by, for example, using a spherical shaped detector patterned into eight quadrants. By comparing the energy collected from each quadrant, accurate directional information will be obtained. The detector need not be spherical. A transformation could be used that results in a core region that is a thin circular disk. This would make the concentrator compatible with common planar detectors.

The device can also provide impedance matching to the detector. This is achieved by applying the inverse transformation to the desired detector, expanding it from the core radius, $R_1$, to the radius $R_2$. It is then possible to design an impedance matching layer, (between $R_1$ and $R_3$), to match the transformed detector to its environment. This impedance matching layer is then transformed with the forward transformation expanding it to fill the region (118) between $R_1$ and $R_3$. The resulting shell layer between $R_1$ and $R_3$, provides both concentration and impedance matching functions.

Figure 12:
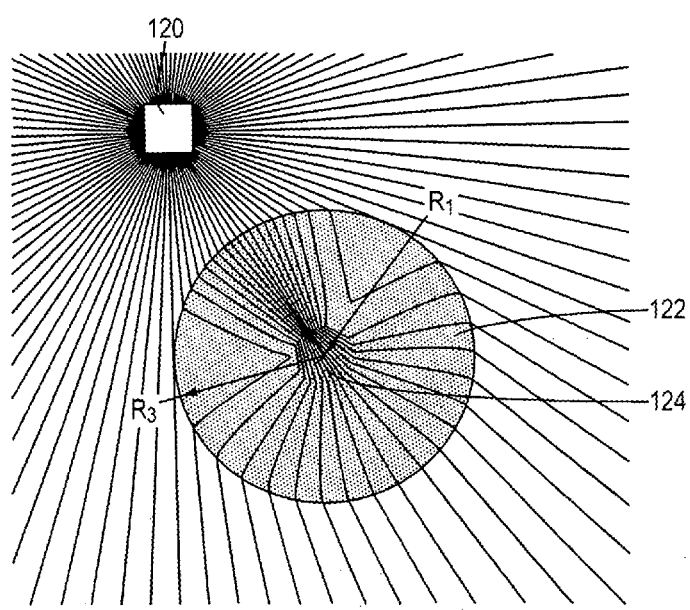
FIG. 12 is a cross-sectional ray trajectory diagram in which rays from a point source incident on a sphere radius $R_3$ are concentrated into an inner sphere radius $R_1$.
Figure 13:
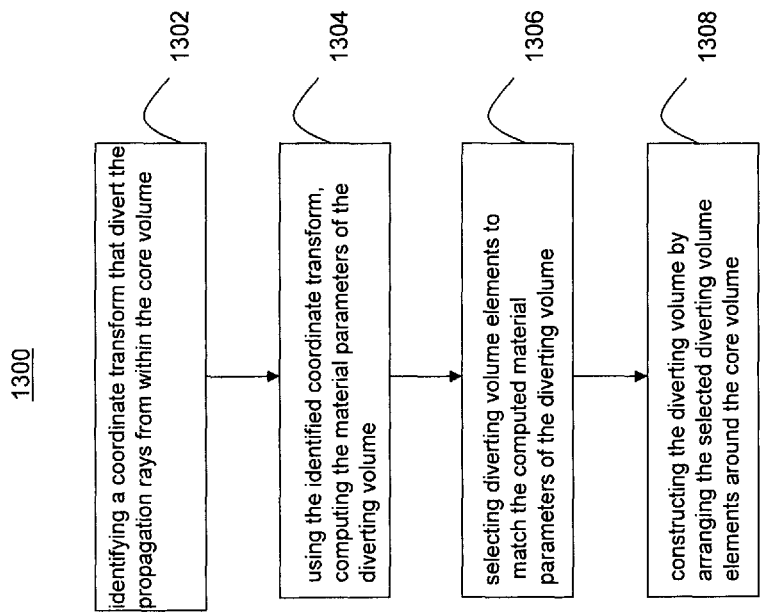
FIG. 13 is a flow chart depicting the steps of method 1300: identifying a coordinate transform (1302); computing the material parameters (1304); selecting diverting volume elements (1306); and constructing the diverting volume (1308).

Like the cloak structures the concentrator (110) can be perfectly matched to its environment, so that if the fields are not disturbed in the core (114) by a detector, the device (110) is undetectable by external electromagnetic probing. This device (110) can operate in both near and far field regimes and at any size scale and wavelength. The basic formalism of this transformation can be applied to other basic geometries, (e.g. cylindrical) or applied conformally to an arbitrarily shaped object. FIG. 12 demonstrates the concentration of rays or field lines from a point source (120) incident upon a sphere (122) radius $R_3$, into an inner core region (124) radius $R_1$.

The co-ordinate transfer mapping theory outlined above has been described with respect to diverting the propagation of electromagnetic waves. However it is noted that there is a significant analogy between electromagnetic and other propagating waves such as acoustic waves. In particular, this theory may be applied to obtain specifications for the mechanical properties of a material such as density and stiffness that yield acoustic cloaking. Such a cloak may be used for example to conceal bodies from sonar detection.

Whilst the description of the cloaking theory above is directed mainly to concealing objects, it will be appreciated that the diversion of electromagnetic disturbances from the cloaked volume into a cloaking shell creates an electromagnetic quiet zone inside. Equation (9) dictates that any electromagnetic radiation produced by an object inside the quiet zone will not be able to emerge from it. This may be put to use in electromagnetic interference shielding applications, for example inside MRI machines. Analogously, acoustic quiet zones may also be achieved.

The application of the present invention is not limited to the cloaking and concentrator structures as shown in the Figures. As demonstrated clearly above, the mathematical solution provided herein applies to cloak a structure of any shape. Furthermore, if a volume is cloaked, an object of any shape or material placed therein will not be detectable by an outside observer, either in reflection mode or transmission mode.

The methods described herein can be used to apply any appropriate coordinate transformation between any appropriate co-ordinate systems and using any appropriate function of the co-ordinates in the original frame. The cloaking structure used to conceal the material within it can be of any shape or thickness. In particular, the cloaking structure does not have to follow the same shape as the object within that is to be concealed. It will be apparent to the skilled reader that the methods described herein can be used to transform all frequencies of electromagnetic radiation, and for a given application can be applied to radiation in any specific frequency range of the electromagnetic spectrum, including infrared, radio, visible light, x-rays, microwaves and radar.

In the examples shown impedance matching has been achieved by the ratio $$\frac{\mu}{\varepsilon} = 1.$$

As will be apparent to the skilled reader, impedance matching of the sort described herein can be achieved for $$\frac{\mu}{\varepsilon} = m$$

where m is any real constant value. In particular, the desired ratio of $\mu/\varepsilon$ will depend on the medium in which the cloaking structure is to be embedded.

The reference J. B. Pendry et al., "Magnetism from Conductors and Enhanced Nonlinear Phenomena," *IEEE Trans. Micro. Theory Tech.* 47 (1999), 2074-2084, above incorporated by reference, includes the following text:

C "Swiss Roll" Capacitor

.... In this instance, we find for the effective permeability $$\mu_{eff} = 1 - \frac{F}{1 + \frac{2\sigma i}{\omega r \mu_0 (N-1)} - \frac{1}{2\pi^2 r^3 \mu_0 (N-1)^2 \omega^2 C}} \quad (29)$$

$$= 1 - \frac{\frac{\pi r^2}{a^2}}{1 + \frac{2\sigma i}{\omega r \mu_0 (N-1)} - \frac{dc_0^2}{2\pi^2 r^3 (N-1)\omega^2}}$$

where F is as before the fraction of the structure not internal to a cylinder, and the capacitance per unit area between the first and the last of the coils is $$C = \frac{\epsilon_0}{d(N-1)} = \frac{1}{\mu_0 dc_0^2 (N-1)}. \quad (30)$$

....

IV. An Isotropic Magnetic Material

.... We propose an adaptation of the "split ring" structure, in which the cylinder is replaced by a series of flat disks each of which retains the "split ring" configuration, but in slightly modified form ....

The effective magnetic permeability we calculate, on the assumption that the rings are sufficiently close together and that the magnetic lines of force are due to currents in the stacked rings, are essentially the same as those in a continuous cylinder. This can only be true if the radius of the rings is of the same order as the unit cell side. We arrive at $$\mu_{eff} = 1 - \frac{\frac{\pi r^2}{a^2}}{1 + \frac{2l\sigma_1}{\omega r \mu_0} i - \frac{3l}{\pi^2 \mu_0 \omega^2 C_1 r^3}} \quad (43)$$

$$= 1 - \frac{\frac{\pi r^2}{a^2}}{1 + \frac{2l\sigma_1}{\omega r \mu_0} i - \frac{3lc_0^2}{\pi \omega^2 \ln \frac{2c}{d} r^3}}$$

where $\sigma_l$ is the resistance of unit length of the sheets measured around the circumference.

The reference J. B. Pendry et al., "Extremely Low Frequency Plasmons in Metallic Mesostructures," *Phys. Rev. Lett* 76 (1996), 4773-4776, above incorporated by reference, includes the following text:

The plasmons have a profound impact on properties of metals, not least on their interaction with electromagnetic radiation where the plasmon produces a dielectric function of the form $$\varepsilon(\omega) = 1 - \frac{\omega_p^2}{\omega(\omega + i\gamma)}, \quad (2)$$

which is approximately independent of wave vector, and the parameter y is a damping term representing dissipation of the plasmon's energy into the system. . . .

In this Letter we show how to manufacture an artificial material in which the effective plasma frequency is depressed by up to 6 orders of magnitude. The building blocks of our new material are very thin metallic wires . . . .

Having both the effective density, $n_{eff}$, and the effective mass, $m_{eff}$, on hand we can substitute into (1), $$\omega_p^2 = \frac{n_{eff} e^2}{\varepsilon_0 m_{eff}} = \frac{2\pi c_0^2}{a^2 \ln(a/r)} \approx (8.2 \text{ GHz})^2. \quad (14)$$

Here is the reduction in the plasma frequency promised.

Note in passing that, although the new reduced plasma frequency can be expressed in terms of electron effective mass and charge, these microscopy quantities cancel, leaving a formula containing only macroscopic parameters of the system: wire radius and lattice spacing.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of constructing a diverting volume for diverting propagation of an incident electromagnetic wave in a specific frequency range below infrared light frequencies around a core volume, the incident electromagnetic wave having an original propagation direction, said method comprising:
   identifying a coordinate transform that diverts the propagation direction from within the core volume to the diverting volume;
   using the identified coordinate transform, computing material parameters of the diverting volume;
   selecting diverting-volume elements to match the computed material parameters of the diverting volume for the specific frequency range; and
   constructing the diverting volume by arranging the selected diverting-volume elements around the core volume, wherein the selected diverting-volume elements are arranged so as to return the incident electromagnetic wave to its original propagation direction;
   wherein the selected diverting-volume elements are formed of a metamaterial; and
   wherein each of the selected diverting-volume elements comprises at least one of a split ring configured to provide a magnetic permeability and a conductive wire configured to provide an electrical permittivity.

2. The method of claim 1, wherein the specific frequency range is a radio frequency range.

3. The method of claim 1, wherein the specific frequency range is a microwave frequency range.

4. The method of claim 1, wherein the specific frequency range is a radar frequency range.

5. A method, comprising:
   diverting an incident electromagnetic wave in a specific frequency range below infrared light frequencies around a core volume, the incident electromagnetic wave having an original propagation direction; and
   returning the incident electromagnetic wave to its original propagation direction;
   wherein the diverting and the returning include propagating the incident electromagnetic wave through a diverting volume having material parameters for the specific frequency range corresponding to a coordinate transformation that maps the core volume to the diverting volume,
   wherein the diverting volume includes an arrangement of metamaterial elements providing the material parameters; and
   wherein each of the metamaterial elements includes at least one of a split ring providing a magnetic permeability and a conductive wire providing an electrical permittivity.

6. The method of claim 5, wherein the specific frequency range is a radio frequency range.

7. The method of claim 5, wherein the specific frequency range is a microwave frequency range.

8. The method of claim 5, wherein the specific frequency range is a radar frequency range.

9. An apparatus, comprising:
   a plurality of diverting-volume elements arranged in a diverting volume around a core volume, the diverting-volume elements being arranged to divert an incident electromagnetic wave in a specific frequency range below infrared frequencies around the core volume and to return the incident electromagnetic wave to its original propagation direction;
   wherein the diverting-volume elements have material parameters in the specific frequency range corresponding to a coordinate transformation that maps the core volume to the diverting volume,
   wherein the diverting-volume elements include metamaterial elements; and
   wherein each of the diverting-volume elements includes at least one of a split ring providing a magnetic permeability and a conductive wire providing an electrical permittivity.

10. The apparatus of claim 9, wherein the specific frequency range is a radio frequency range.

11. The apparatus of claim 9, wherein the specific frequency range is a microwave frequency range.

12. The apparatus of claim 9, wherein the specific frequency range is a radar frequency range.

* * * * *